United States Patent
Fuse et al.

(10) Patent No.: US 10,063,743 B2
(45) Date of Patent: Aug. 28, 2018

(54) IMAGE PROCESSING APPARATUS, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventors: Koji Fuse, Tokyo (JP); Tomokazu Yanai, Yokohama (JP); Hisashi Ishikawa, Urayasu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/351,743

(22) Filed: Nov. 15, 2016

(65) Prior Publication Data

US 2017/0142290 A1 May 18, 2017

(30) Foreign Application Priority Data

Nov. 16, 2015 (JP) ................. 2015-224232

(51) Int. Cl.
*G06K 15/00* (2006.01)
*H04N 1/40* (2006.01)
*H04N 1/409* (2006.01)
*H04N 1/405* (2006.01)
*H04N 1/60* (2006.01)

(52) U.S. Cl.
CPC .......... *H04N 1/4092* (2013.01); *H04N 1/405* (2013.01); *H04N 1/6008* (2013.01); *H04N 2201/0094* (2013.01)

(58) Field of Classification Search
CPC .... H04N 1/4092; H04N 1/405; H04N 1/6008; H04N 2201/0094
USPC ........................ 358/2.1, 1.9, 453, 538, 448
See application file for complete search history.

(56) References Cited

U.S. PATENT DOCUMENTS

| | | | |
|---|---|---|---|
| 9,485,388 B2 | 11/2016 | Kodama et al. | |
| 2009/0097776 A1* | 4/2009 | Fukamachi | H04N 1/405 382/269 |
| 2010/0046851 A1* | 2/2010 | Inoue | G06T 3/4007 382/260 |
| 2014/0355010 A1 | 12/2014 | Hara et al. | |
| 2014/0376056 A1 | 12/2014 | Fujimoto et al. | |
| 2016/0004942 A1 | 1/2016 | Sumi et al. | |

FOREIGN PATENT DOCUMENTS

JP 2005-167831 A 6/2005

\* cited by examiner

*Primary Examiner* — Quang N Vo
(74) *Attorney, Agent, or Firm* — Carter, Deluca, Farrell & Schmidt, LLP

(57) ABSTRACT

An image that is to be a target for filtering processing is acquired, a plurality of filters having mutually different filter sizes and arrangement spacing for significant coefficients in the filters are applied to the image to perform filtering processing on the image.

21 Claims, 13 Drawing Sheets

1001

1002

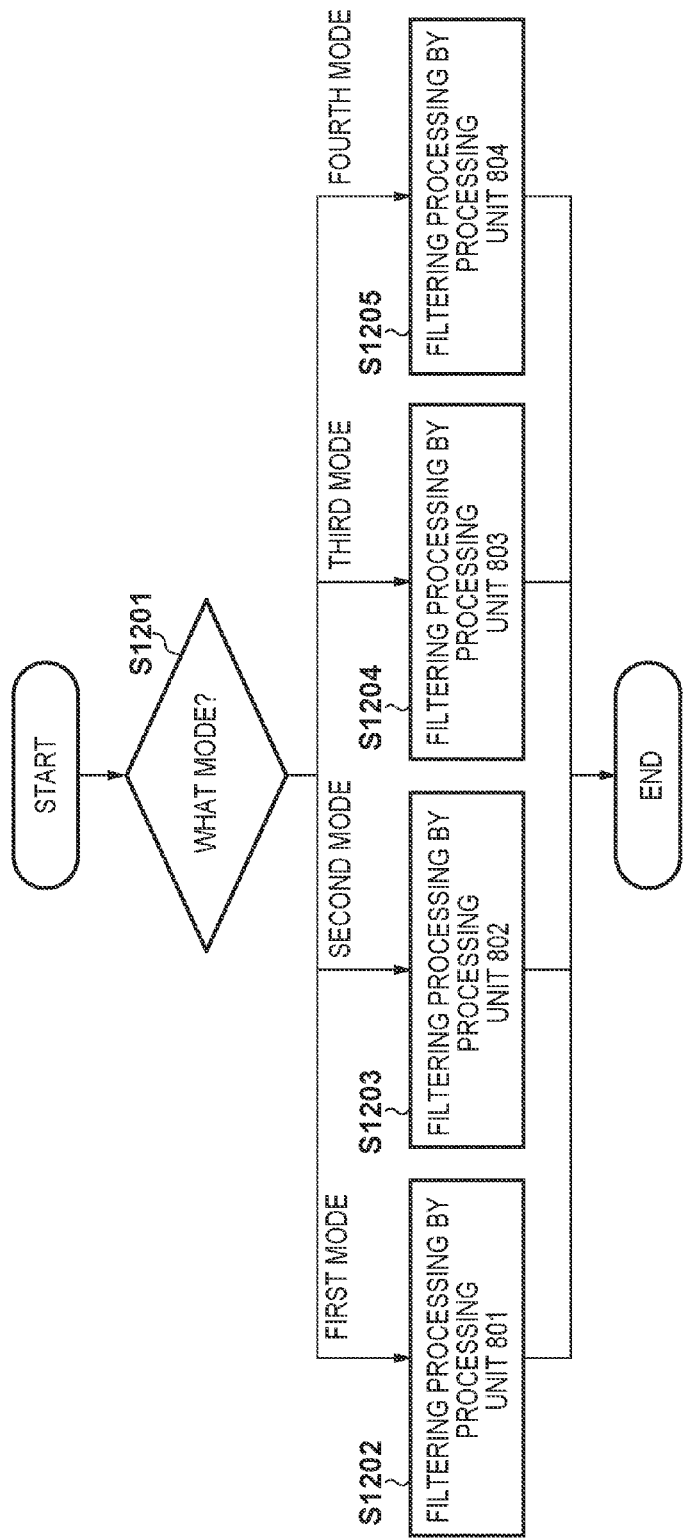

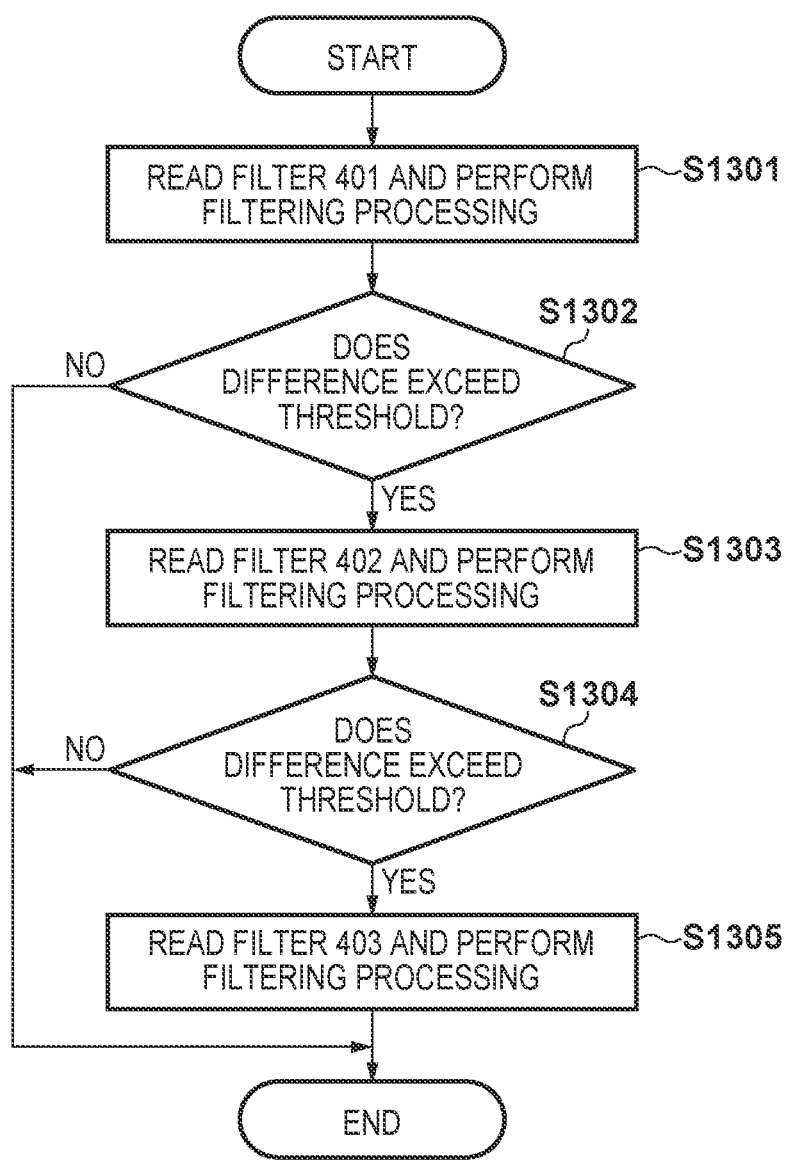

1403

1402

1405

1401

1404

IMAGE PROCESSING APPARATUS, IMAGE PROCESSING METHOD, AND NON-TRANSITORY COMPUTER-READABLE STORAGE MEDIUM

BACKGROUND OF THE INVENTION

Field of the Invention

The present invention relates to a filtering processing technique.

Description of the Related Art

Conventionally, when outputting after performing image forming, local (vicinity) image processing such as spatial filtering is performed. Local image processing is image processing that uses a plurality of reference pixels (pixels that are a processing target and pixels in a vicinity thereof) included in a reference area of an input image. For example, in spatial filtering such as edge enhancement processing or blurring processing, a value of a pixel that is to be a processing target is obtained by a product-sum operation between values of reference pixels and filter coefficients. Because a number of product-sum operations (hereinafter, a calculation amount is used as an abbreviated name) is equal to a number of reference pixels, an increase in the calculation amount frequently becomes a problem if a size of a reference area (the size of a filter) is set to be large when trying to implement desired characteristics.

Accordingly, as a conventional technique for solving this problem, there is the technique disclosed in Japanese Patent Laid-Open No. 2005-167831. That is, by using an interlaced image (an image where lines are thinned) for an input image and setting a filter coefficient for lines not input to 0, the number of reference pixels used in product-sum operations (hereinafter, an abbreviated name of tap number is used) is reduced while maintaining the size of the reference area for the filter.

However, because an upper limit for a frequency band in which it is possible to perform control by spatial filtering well decreases as the spacing of reference pixels spreads, if the spacing of reference pixels spreads due to reducing the tap number without changing the size of the reference area, high frequency controllability decreases.

SUMMARY OF THE INVENTION

The present invention was conceived in view of these kinds of problems, and provides a technique for enabling control from low frequencies to high frequencies even if the number of pixels referred to in filtering processing are reduced.

According to the first aspect of the present invention, there is provided an image processing apparatus comprising: an acquisition unit configured to acquire an image that is to be a target of filtering processing; and a processing unit configured to perform filtering processing to the image by applying to the image a plurality of filters each having a mutually different filter size and arrangement spacing of significant coefficients in the filter.

According to the second aspect of the present invention, there is provided an image processing method that an image processing apparatus performs, the method comprising: acquiring an image that is to be a target of filtering processing; and performing filtering processing to the image by applying to the image a plurality of filters each having a mutually different filter size and arrangement spacing of significant coefficients in the filter.

According to the third aspect of the present invention, there is provided a non-transitory computer-readable storage medium storing a computer program for causing a computer to function as an acquisition unit configured to acquire an image that is to be a target of filtering processing; and a processing unit configured to perform filtering processing to the image by applying to the image a plurality of filters each having a mutually different filter size and arrangement spacing of significant coefficients in the filter.

Further features of the present invention will become apparent from the following description of exemplary embodiments (with reference to the attached drawings).

BRIEF DESCRIPTION OF THE DRAWINGS

FIG. 12 is a flowchart of operation of the spatial filter circuit 230 in a second embodiment.

FIG. 13 is a flowchart of operation of the spatial filter circuit 230 in a third embodiment.

DESCRIPTION OF THE EMBODIMENTS

Below, explanation will be given for embodiments of present invention with reference to the accompanying drawing. Note that embodiments described below merely illustrate examples of specifically implementing the present invention, and are only specific embodiments of a configuration defined in the scope of the claims.

First Embodiment

Figure 1:
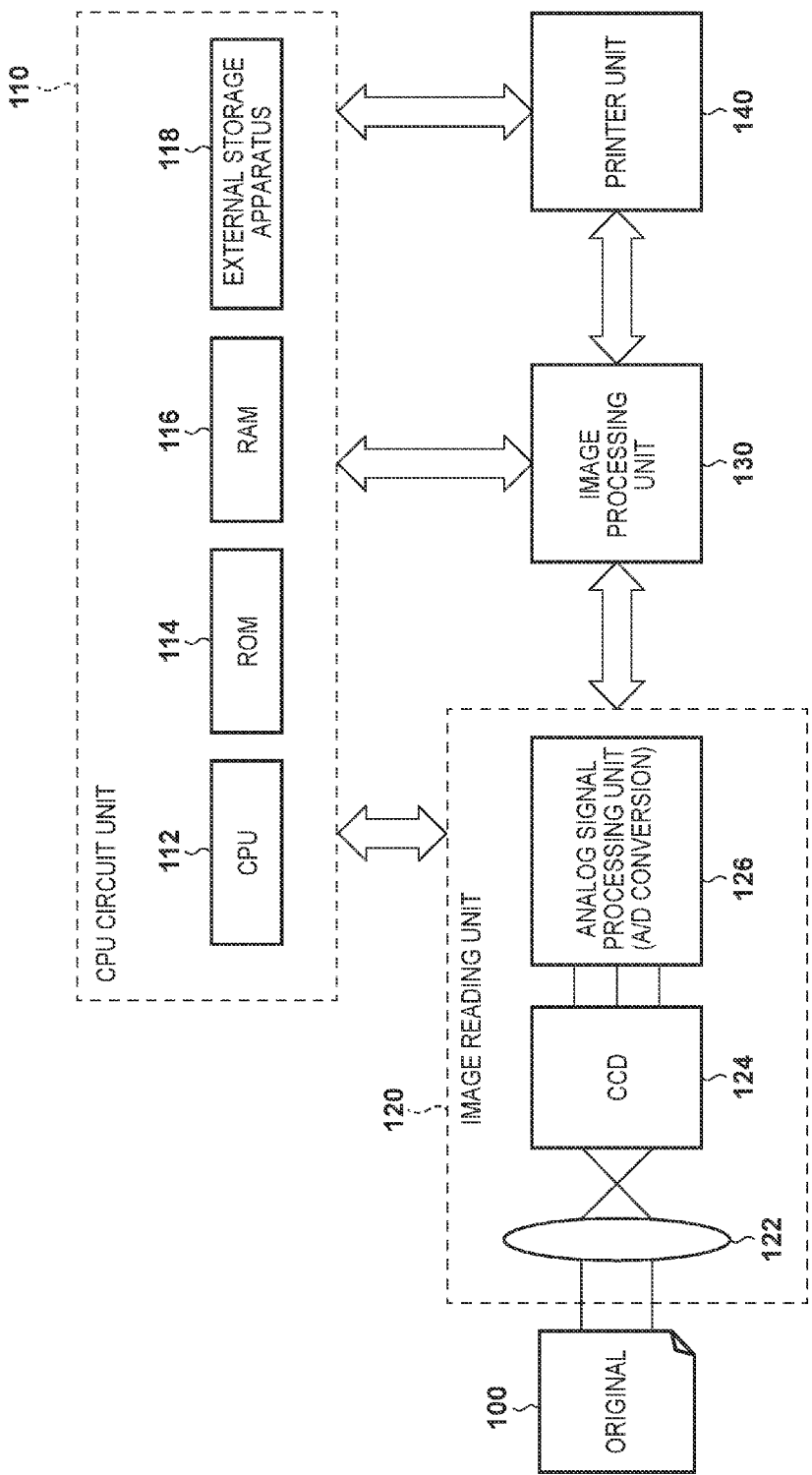
FIG. 1 is a block diagram illustrating an example of a hardware configuration of a multifunction peripheral.

Explanation is given below regarding an example of an image processing apparatus that acquires an image that is to be a target for filtering processing, and applies to the image a plurality of filters having different filter sizes and arrangement spacing for significant coefficients in the filters to perform filtering processing on the image. In the present embodiment, explanation is given for a case in which the image processing apparatus is applied to a multifunction peripheral having a scan function and a print function. Firstly, the block diagram of FIG. 1 is used to give an explanation regarding an example of a hardware configuration of a multifunction peripheral according to the present embodiment. As illustrated in FIG. 1, the multifunction peripheral has an image reading unit 120 for reading as image information an original 100 that is a reading target, an image processing unit 130 for performing various image processing, a printer unit 140 having a print function, and a CPU circuit unit 110 for performing operation control of the multifunction peripheral overall.

Firstly, explanation is given for the image reading unit 120. An image of the original 100 formed by a CCD 124 through a lens 122 is converted into an analog electrical signal (an analog electrical signal for each color of R (Red), G (Green), and B (Blue)) by the CCD 124. An analog signal processing unit 126, after performing processing such as correction on the analog electrical signal converted by the CCD 124, performs an analog/digital conversion (A/D conversion) to thereby convert the analog electrical signal into a digital electrical signal (a full color signal). The analog signal processing unit 126 then outputs the digital electrical signal after the conversion to the image processing unit 130, which is a subsequent stage.

The image processing unit 130 performs various image processing, such as input correction processing, spatial filtering, color space conversion processing, density correction processing, and halftone processing on an image represented by the digital electrical signal output from the analog signal processing unit 126. The image processing unit 130 outputs the image after this image processing has been performed to the printer unit 140. The printer unit 140 is something that has a print output function such as a raster plotter that uses an inkjet head or a thermal head for example, and prints the image output from the image processing unit 130 on a printing medium such as paper.

Next, explanation is given regarding the CPU circuit unit 110. By using a computer program and data stored in the ROM 114 or the RAM 116 to execute processing, the CPU 112 performs operation control of the multifunction peripheral overall, and also executes or controls various processing that is described below as something that the multifunction peripheral performs. In the ROM 114, setting data for the multifunction peripheral that does not need to be rewritten, a boot control program for causing the CPU 112 to control activation of the multifunction peripheral, a basic operation program for causing the CPU 112 to execute or control a basic operation of the multifunction peripheral, or the like are stored. The RAM 116 has an area for storing a computer program or data loaded from the ROM 114 or an external storage apparatus 118, and various data input from the image reading unit 120 or the printer unit 140. Furthermore the RAM 116 has a work area that is used when the CPU 112 executes various processing. In this way, the RAM 116 can appropriately provide various areas. The external storage apparatus 118 is a large capacity information storage device such as a hard disk drive device or a flash memory. In the external storage apparatus 118, an OS (operating system), a computer program and data for causing the CPU 112 to execute or control various processing described later, or the like are saved. The computer program and data saved/stored in the external storage apparatus 118 or the ROM 114 are appropriately loaded in the RAM 116 in accordance with control by the CPU 112, and become a target of processing by the CPU 112.

Figure 2:
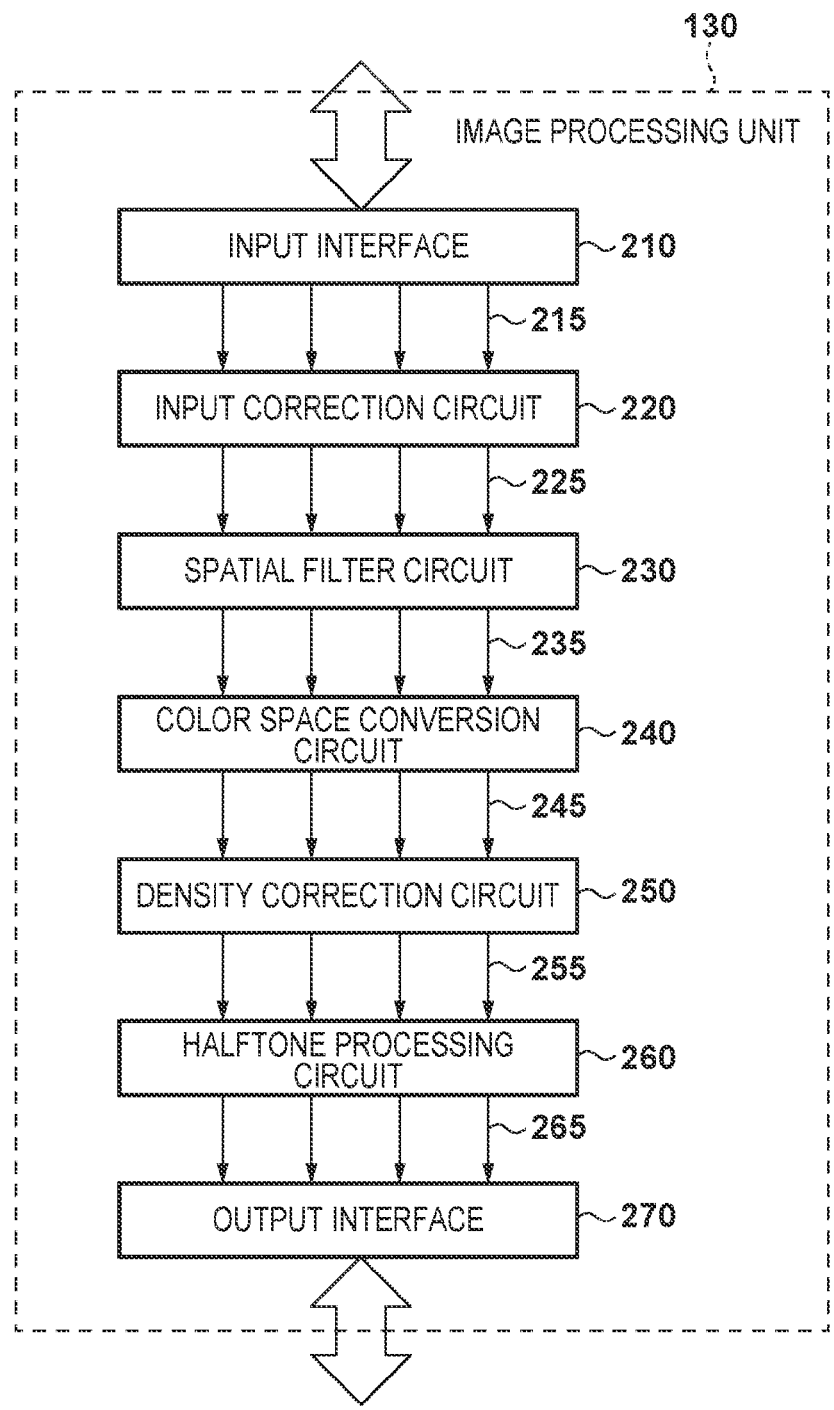
FIG. 2 is a block diagram illustrating an example configuration of an image processing unit 130.

Next, the block diagram of FIG. 2 is used to give an explanation regarding an example configuration of the image processing unit 130. The image (R, G, and B luminance signals) output from the analog signal processing unit 126 is input as an image 215 to an input correction circuit 220 via an input interface 210. The input correction circuit 220 performs, with respect to the image 215, processing for performing correction of light distribution characteristics of a lamp for illuminating an original, variation of characteristics of a sensor for reading the original 100, or the like, and outputs a corrected image 225 to a spatial filter circuit 230 which is a subsequent stage.

The spatial filter circuit 230 performs filtering processing that uses a filter on the image 225—specifically local image processing such as smoothing or edge enhancement, and outputs an image 235 for which filtering processing is complete to a color space conversion circuit 240 which is a subsequent stage. The color space conversion circuit 240 converts the image 235 (R, G, and B luminance signals) into a density signal 245 (density signals C (Cyan), M (Magenta), Y (Yellow), K (Black), and outputs the density signal 245 to a density correction circuit 250 which is a subsequent stage.

The density correction circuit 250 performs density correction on the density signal 245. This is because there is a need to perform density correction in advance by considering characteristics of halftone processing, so that a density change does not arise when binarization processing is performed by a halftone processing circuit 260 which is a subsequent stage. The density correction circuit 250 outputs a density signal 255 for which density correction is complete to the halftone processing circuit 260 which is a subsequent stage. The halftone processing circuit 260 performs screen processing to the density signal 255 to transform it into a binary digital image signal (printing signal C, M, Y, K) 265 that is a binary halftone representation. The halftone processing circuit 260 then outputs the binary digital image signal 265 to the printer unit 140 via an output interface 270.

Note that, in the present embodiment, the input correction circuit 220, the spatial filter circuit 230, the color space conversion circuit 240, the density correction circuit 250, and the halftone processing circuit 260 are all assumed to be configured by a circuit, in other words hardware. However, function of a portion of or all of each circuit may be configured by software. In such a case, this software is saved in the external storage apparatus 118 in advance, and by loading it into the RAM 116 as necessary and the CPU 112 executing it, the corresponding function is realized.

Next, explanation is given regarding operation of the spatial filter circuit 230. Here, explanation is given regarding the problem to be solved of the technique recited in the above described Japanese Patent Laid-Open No. 2005-167831. As described above, the technique recited in Japanese Patent Laid-Open No. 2005-167831 thins out a number of reference pixels used in a product-sum operation (hereinafter, abbreviated as tap number) while maintaining the size of a reference area. Below, this technique is referred to as thinning processing.

Figure 3:
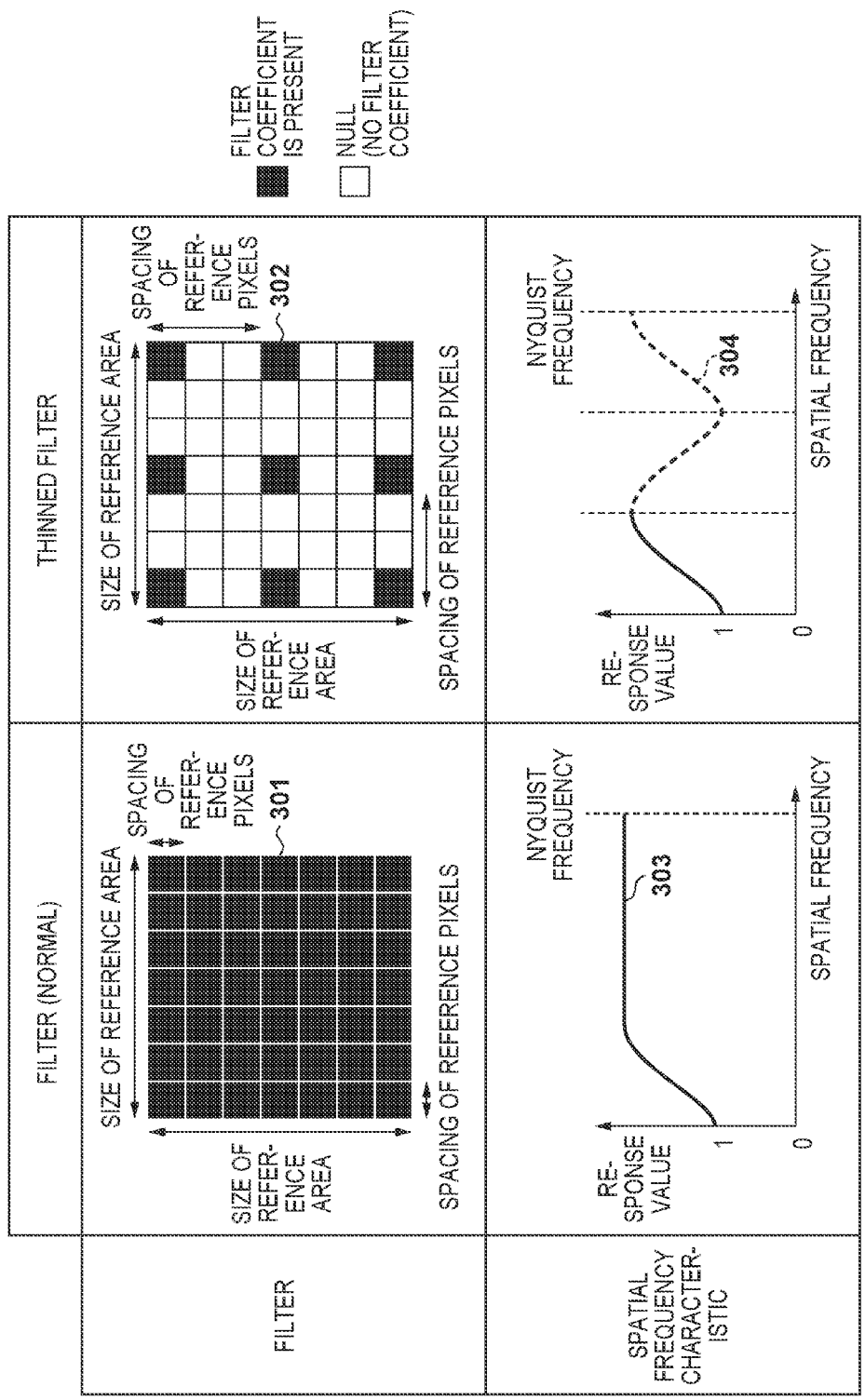
FIG. 3 is a view for comparing normal filtering processing and thinning processing.

FIG. 3 is a view for comparing normal filtering processing and thinning processing with respect to a reference area having 7 vertical pixels×7 horizontal pixels. The reference numerals 301 and 302 both represent a filter, and each square that configures a filter represents a filter coefficient. Here, squares filled with black represent filter coefficients having significant values (significant coefficients), and blank squares represent filter coefficients having inactive values (e.g. 0 or NULL) (inactive coefficients). The filters 301 and 302 each form a matrix of 7 horizontal×7 vertical filter coefficients. Because the filter 301, which is used in normal filtering processing, is configured from significant coefficients corresponding to the pixels in the reference area, it is configured from 7 vertical×7 horizontal significant coefficients, and in addition, the distance between significant coefficients (the distance between reference pixels) is one pixel. Meanwhile, in thinning processing, because reference pixels are thinned-out, significant coefficients in the filter 302 have been correspondingly thinned-out in comparison to the filter 301. In FIG. 3, significant coefficients appear every three squares both vertically and horizontally, and other filter coefficients are inactive coefficients. Here, because pixels corresponding to inactive coefficients are not a target of calculation, a calculation amount for filtering processing that uses the filter 302 becomes approximately 18% of the calculation amount of filtering processing that uses the filter 301, and from the perspective of a calculation amount, this is reduced in comparison to normal filtering processing.

A lower limit for a frequency band in which is possible to perform control according to filtering processing well depends on a filter size (the size of the reference area). In the case of FIG. 3, because the size of the filter 301 and the size of the filter 302 are the same, if the filter 302 is used, controllability equal to the controllability of a low frequency component in a case of using the filter 301 is obtained, in addition to reducing the calculation amount in comparison to normal filtering processing. In the case of FIG. 3, a frequency characteristic 304 for when the filter 302 is used realizes a frequency characteristic that is the same as a frequency characteristic 303 of normal filtering processing up until a frequency of ⅓ of the Nyquist frequency.

However, an upper limit for the frequency band at which it is possible to perform control according to filtering processing well decreases as the spacing of the reference pixels (an arrangement spacing of significant coefficients) spreads. Note that the arrangement spacing of significant coefficients means the spacing from other significant coefficients if there are other significant coefficients positioned above, below, to the left and to the right. As described above, whereas the arrangement spacing for significant coefficients in the filter 301 is one pixel, the arrangement spacing for significant coefficients in the filter 302 is three pixels. Therefore, in frequencies that exceed ⅓ of the Nyquist frequency, the frequency characteristic 304 deviates from the frequency characteristic 303. Generally, if thinning is performed such that significant coefficients are present every n squares (if the spacing for reference pixels is n pixels), it is possible to control low frequencies until 1/n of the Nyquist frequency, but high frequencies that exceed 1/n of the Nyquist frequency cannot be controlled.

Figure 4:
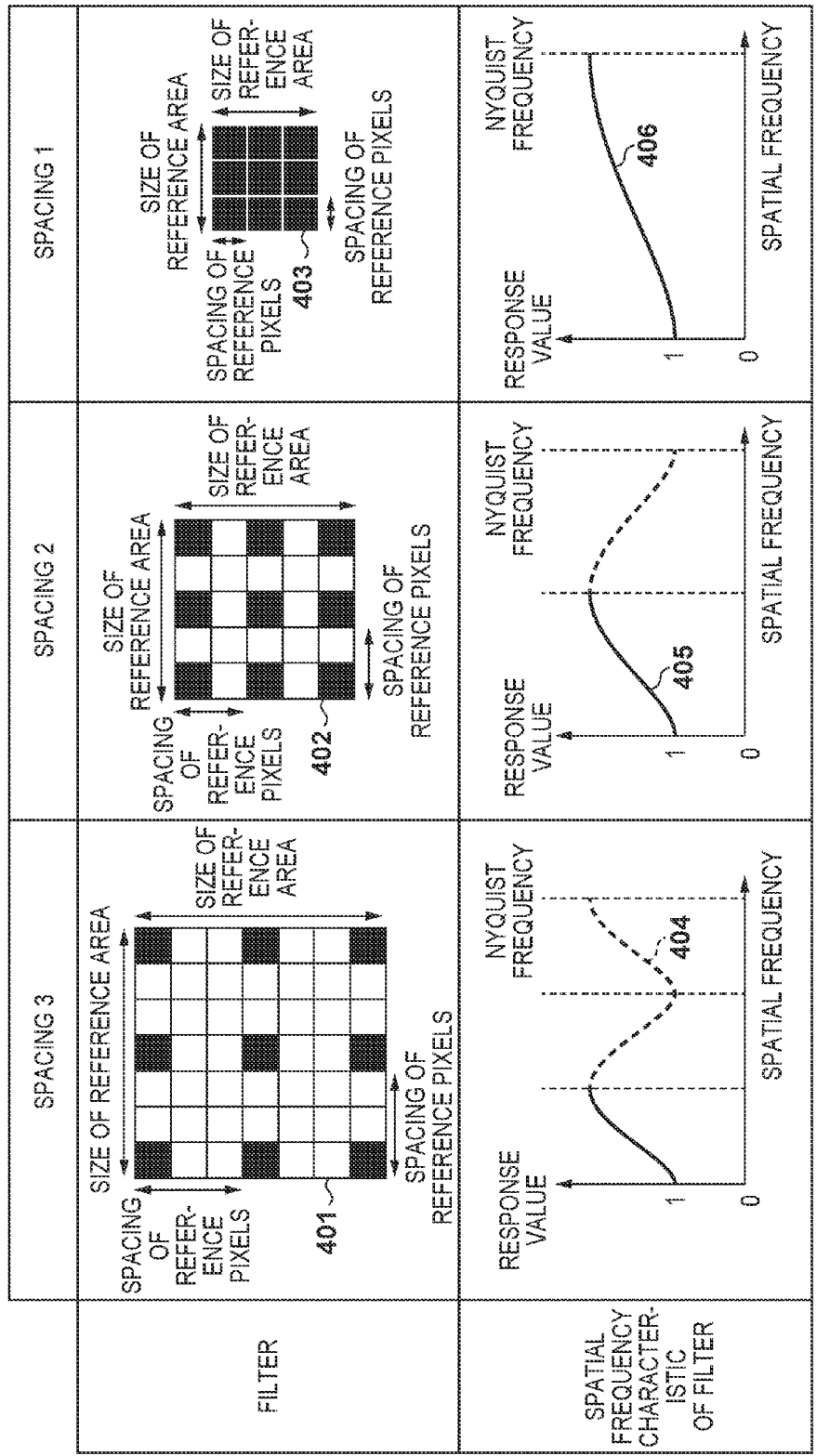
FIG. 4 is a view for explaining filters 401 through 403.

In the present embodiment, in view of such a problem, to perform control well from low frequencies up until high frequencies, a plurality of filters are used as filter to apply to an image. The filter size and arrangement spacing of significant coefficients in the filter are mutually different for each filter. Note that the filter size is the size of a rectangular area surrounded by significant coefficients, and indicates the size of the reference area. In the present embodiment, specifically the significant coefficients for the plurality of filters to apply are each arranged in a grid pattern evenly spaced apart. In addition, although the arrangement spacing for significant coefficients is mutually different for each filter, the number of significant coefficients (reference pixels) included in each filter is the same. Furthermore, in the present embodiment, this plurality of filters is a collection of filters for which the arrangement spacing of significant coefficients decreases as the filter size decreases. Here, three filters as "a plurality of filters having different filter sizes and arrangement spacing for significant coefficients in the filters" are illustrated in FIG. 4.

A filter 401 is a filter that is applied to a reference area of 7 vertical pixels×7 horizontal pixels, and thus is comprised from 7 vertical×7 horizontal filter coefficients. Significant coefficients in the filter 401 are arranged at spacing "3" as illustrated by the squares filled by black. The filter 401 takes nine pixels as reference pixels: the pixel position of a pixel of interest, pixel positions that are three pixels above, below, to the left and to the right with respect to the pixel of interest, and four pixel positions that are positioned at diagonals separated by 3√2 pixels from the pixel of interest. A filter 402 is a filter that is applied to a reference area of 5 vertical pixels×5 horizontal pixels, is therefore comprised from 5 vertical×5 horizontal filter coefficients, and the significant coefficients are arranged with spacing "2" as illustrated by the squares filled with black. The filter 402 takes nine pixels as reference pixels: the pixel position of a pixel of interest, the pixel positions that are separated by 2 pixels above, below, to the left and to the right with respect to the pixel of interest, and four pixel positions that are positioned at diagonals separated by 2√2 pixels from the pixel of interest. A filter 403 is a filter that is applied to a reference area of 3 vertical pixels×3 horizontal pixels, is therefore comprised from 3 vertical×3 horizontal filter coefficients, and the significant coefficients are arranged with spacing "1" as illustrated by the squares filled with black. A filter 403 has nine pixels as reference pixels, including the pixel position of a pixel of interest, and also comprising pixel positions neighboring above, below, to the left and to the right, as well as those positioned diagonally. The filters 401, 402, and 403 each have different arrangement of significant coefficients, and have different frequency components to control.

If filters such as these three are used to perform filtering processing with respect to an image, firstly the filter 401 is arranged so that its center position overlaps with the pixel position of a pixel of interest. A product-sum operation is then performed between the values of the significant coefficients in the filter 401 and pixel values of pixels at the pixel positions corresponding to the significant coefficients, and a result of this product-sum operation is set as the pixel value of the pixel of interest. By performing this calculation for each pixel position, filtering processing that uses the filter 401 is realized. By filtering processing that uses the filter 401, the frequency component is controlled until ⅓ of the Nyquist frequency as illustrated by reference numeral 404. An image to which filtering processing that uses the filter 401 is applied becomes a target of filtering processing that uses the filter 402.

Next, the filter 402 is arranged so that its center position overlaps with the pixel position of the pixel of interest. A product-sum operation is then performed between the values of the significant coefficients in the filter 402 and pixel values of pixels at the pixel positions corresponding to the significant coefficients, and a result of this product-sum operation is set as the pixel value of the pixel of interest. By performing this calculation for each pixel position, filtering processing that uses the filter 402 is realized. By further performing filtering processing that uses the filter 402 to an image that has been subject to filtering processing by the filter 401, the frequency component is controlled until ½ of the Nyquist frequency as illustrated by reference numeral 405. Because low frequencies are already controlled until ⅓ of the Nyquist frequency by the first filtering processing, in the second filtering processing mainly medium frequencies from ⅓ of the Nyquist frequency to ½ of the Nyquist frequency are controlled. An image to which filtering processing that uses the filter 403 is applied becomes a target of filtering processing that uses the filter 402.

Next, the filter 403 is arranged so that its center position overlaps with the pixel position of the pixel of interest. A product-sum operation is the performed between the values of the significant coefficients in the filter 403 and pixel values of pixels at the pixel positions corresponding to the significant coefficients, and a result of this product-sum operation is set as the pixel value of the pixel of interest. By performing this calculation for each pixel position, filtering processing that uses the filter 403 is realized. By further performing filtering processing that uses the filter 403 to an image that has been subject to filtering processing by the filter 401 and the filter 402, the frequency component is controlled until the Nyquist frequency as illustrated by reference numeral 406. Because low/medium frequencies are already controlled until ½ of the Nyquist frequency by the first filtering processing and the second filtering processing, in the third filtering processing mainly high frequencies at or above ½ of the Nyquist frequency are controlled.

Figure 5:
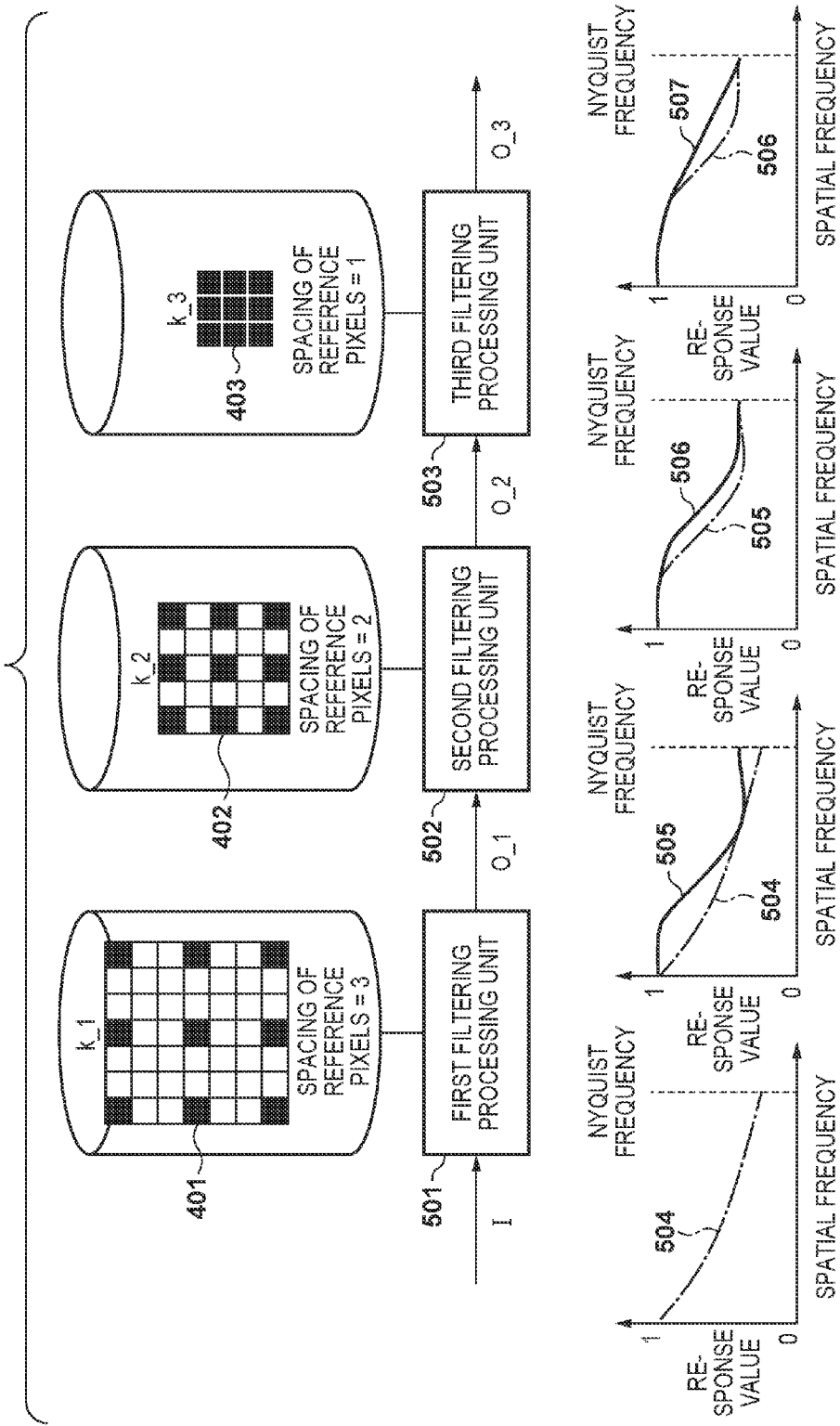
FIG. 5 is a block diagram illustrating a first example configuration of a spatial filter circuit 230.

In this way, by sequentially applying to an image a plurality of filters that arrange significant coefficients in accordance with a frequency component that is desired to be controlled, it is possible to satisfactorily perform control from low frequencies to high frequencies. In the case of FIG. 4, because processing in which the tap number is 3×3 is performed three times, the calculation amount is 55% of the calculation amount of filtering processing that uses the filter 301 (where the tap number is 7×7). Filtering processing that sequentially applies each of "a plurality of filters each having a mutually different filter size and an arrangement spacing of significant coefficients in the filter" to an image, as described here, is performed by the spatial filter circuit 230. An example configuration of the spatial filter circuit 230 in a case of sequentially applying the filters 401 through 403 to an image is illustrated in FIG. 5. A first filtering processing unit 501 performs filtering processing (first filtering processing) that applies k_1 which is the filter 401 to an input image I that has a frequency characteristic 504. In the first filtering processing, as illustrated by Equation (1) below, by performing a calculation that convolves k_1 with respect to the input image I (a convolution operation), an image O_1 having a frequency characteristic 505 is generated.

$$O\_1 = k\_1 * I \quad (1)$$

Next a second filtering processing unit 502 performs filtering processing (second filtering processing) that applies k_2 which is the filter 402 to the image O_1 that has the frequency characteristic 505. In the second filtering processing, as illustrated by Equation (2) below, by performing a calculation that convolves k_2 with respect to the image O_1 (a convolution operation), an image O_2 having a frequency characteristic 506 is generated.

$$O\_2 = k\_2 * O\_1 \quad (2)$$

Next a third filtering processing unit 503 performs filtering processing (third filtering processing) that applies k_3 which is the filter 403 to the image O_2 that has the frequency characteristic 506. In the third filtering processing, as illustrated by Equation (3) below, by performing a calculation that convolves k_3 with respect to the image O_2 (a convolution operation), an image O_3 having a frequency characteristic 507 is generated.

$$O\_3 = k\_3 * O\_2 \quad (3)$$

The third filtering processing unit 503 then outputs the generated image O_3 to the color space conversion circuit 240, which is a subsequent stage.

Each filtering process of the first filtering processing, the second filtering processing, and the third filtering processing is processing that recovers from blurring of the optical system, and the frequency characteristic 504 represents a blurring characteristic of the optical system. In the first filtering processing, because the frequency characteristic 404 of the filter 401 is multiplied against the frequency characteristic 504, the frequency characteristic changes from the frequency characteristic 504 to be like the frequency characteristic 505, and that mainly low frequencies are controlled is understood. In the second filtering processing, because the frequency characteristic 405 of the filter 402 is multiplied against the frequency characteristic 505, the frequency characteristic changes from the frequency characteristic 505 to be like the frequency characteristic 506, and that mainly medium frequencies are controlled is understood. In the third filtering processing, because the frequency characteristic 406 of the filter 403 is multiplied against the frequency characteristic 506, the frequency characteristic changes from the frequency characteristic 506 to be like the frequency characteristic 507, and that mainly high frequencies are controlled is understood.

Figure 6:
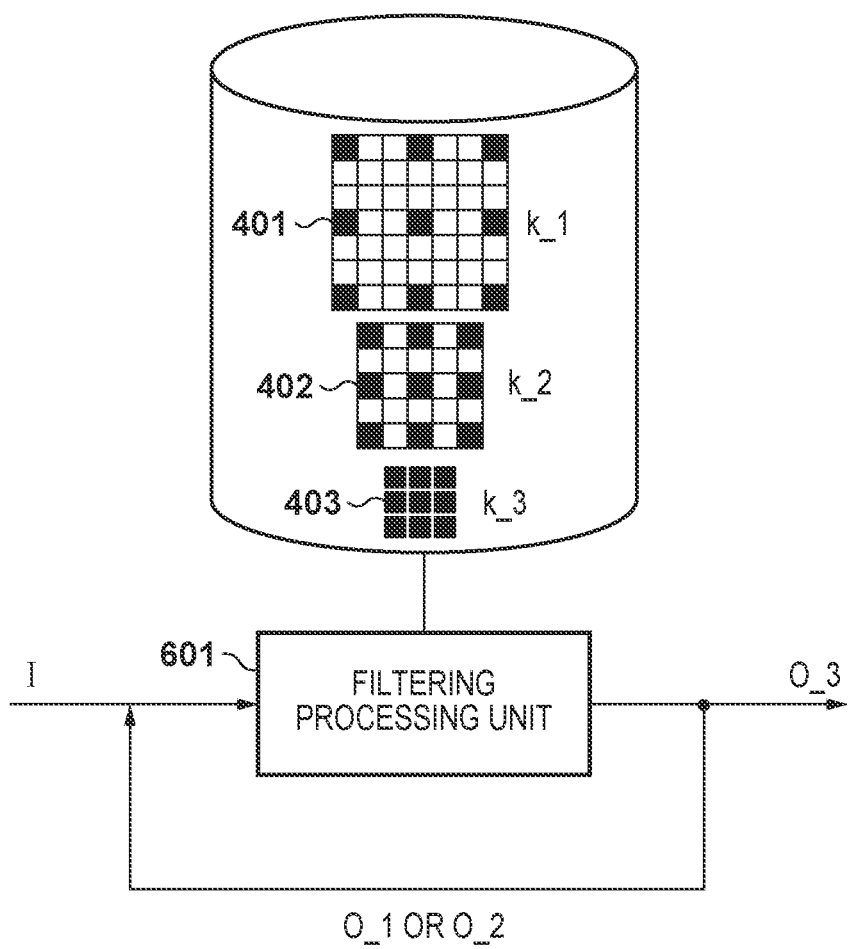
FIG. 6 is a block diagram illustrating a second example configuration of the spatial filter circuit 230.

Note that the configuration of the spatial filter circuit 230 is not limited to the configuration illustrated in FIG. 5. As in the present embodiment, if the number of reference pixels used in each filtering processing (tap number) is the same, there is no need to just provide a number of filtering processing units equal to a number of filtering processing. As illustrated in FIG. 6 for example, configuration may also be taken such that one filter processing unit 601 appropriately changes a filter to execute filtering processing.

The filter processing unit 601 performs filtering processing that uses the filter 401 with respect to the input image I (Equation (1)), and feeds back the image O_1 generated from that result to itself. Next the filter processing unit 601 performs filtering processing that uses the filter 402 with respect to the image O_1 that was fed back (Equation (2)), and feeds back the image O_2 generated from that result to itself. Next the filter processing unit 601 performs filtering processing that uses the filter 403 with respect to the fed back image O_2 (Equation (3)), and outputs the image O_1 generated as a result to the color space conversion circuit 240, which is a subsequent stage. In this way, even with the configuration of FIG. 6, it is possible to obtain filtering result that is the same as of that with the configuration of FIG. 5.

In this way, if the number of reference pixels used in each the filtering processing (tap number) is the same, it is possible to execute filtering processing a plurality of times by the same filtering processing unit. In addition, even if the number of reference pixels used in each filtering processing is different, if there is one filter for which a number of reference pixels is a maximum, it is possible to execute filtering processing a plurality of times by the same filtering processing unit by setting a filter coefficient that corresponds to an unnecessary reference pixel to be an inactive coefficient.

Note that an image finally obtained by a plurality of filtering processes explained above (O_3 in the examples of FIG. 5 and FIG. 6) is desired to be as close to an image obtained by normal filtering processing as possible. When a filter used in normal filtering processing (for example, the filter 301 of FIG. 3) is set to k_b, an image O_b obtained from the input image I by normal filtering processing is as Equation (4) below.

$$O\_b = k\_b * I \quad (4)$$

However, an image finally obtained by a plurality of filtering processes (O_3 in the examples of FIG. 5 and FIG. 6) is as Equation (5) by the above Equation (1) through Equation (3).

$$O\_3 = k\_1 * k\_2 * k\_3 * I \quad (5)$$

Therefore, by Equation (4) and Equation (5), to make the image finally obtained by a plurality of filtering processes (O_3 in this example) become close to the image O_b obtained by normal the filtering processing, that a condition such as the following is necessary is understood. In other words, that a filter k_t obtained by combining each filter used in a plurality of filtering processes (in the example here, k_t=k_1*k_2*k_3) is close to a filter k_b used in normal filtering processing can be said to be a condition. Specifically, if a distance (difference) between k_t and k_b is set to d, that the distance d is close can be said to be a condition. If a Euclidean distance is used as the distance d, the distance d can be obtained by the following Equation (6).

$$d = (\Sigma (k\_t - k\_b)^2)^{0.5} \quad (6)$$

The $\Sigma$ here represents a sum total for all filter coefficient positions in the filters k_t and k_b. In other words, $\Sigma(k\_t-k\_b)^2$ represents a sum of squares of, for each filter coefficient of the filter k_t, the difference between the position of the filter coefficient and a corresponding filter coefficient at a position in the filter k_b.

Note that a definition of the distance d is not limited to Equation (6), and any measure may be used if it can represent the difference between k_t and k_b. For example, the frequency characteristics of k_t and k_b are assumed to be K_t(u, v) and K_b(u, v) (achieved by performing a discrete Fourier transformation on k_t(p, q) and k_b(p, q) to obtain absolute values). At this point, a Euclidean distance, a Chebyshev distance, or the like for K_t(u, v) and K_b(u, v) can be used as the distance d. Note that p is an x direction position for each filter coefficient in a filter, q is a y direction position for each filter coefficient in the filter, u is a spatial frequency of the x direction, and v is the spatial frequency of the y direction.

In this way, regardless of which measure the distance d is expressed by, each filter used in a plurality of filtering processes (in the examples of FIG. 5 and FIG. 6: k_1, k_2, and k_3) is obtained in advance as follows. In other words, in a case where k_b is given, an optimization problem of minimizing the distance d can be calculated by solving a publicly known algorithm such as gradient method. In this way, each filter used in a plurality of filtering processes is obtained by solving an optimization problem for minimizing a measure indicating a difference between the filter coefficient k_t that combines each filter by a convolution operation and the filter coefficient k_b used in normal filtering processing. Thus, an image finally obtained by a plurality of filtering processes explained above (O_3 in the examples of FIG. 5 and FIG. 6) becomes close to an image O_b obtained by normal filtering processing.

Note that a method of obtaining the filters k_1, k_2, and k_3 is not limited to a method for obtaining such as this. Regardless of which method of obtaining is employed, the filters k_1, k_2, and k_3 are created in advance, stored in the external storage apparatus 118 or the ROM 114, and appropriately referred to by the spatial filter circuit 230. Note that configuration may be taken such that it is possible to edit, add or delete a created filter. In such a case, the filter is caused to be saved in a memory for which read/write is enabled such as the external storage apparatus 118, and not the ROM 114.

Figure 7:
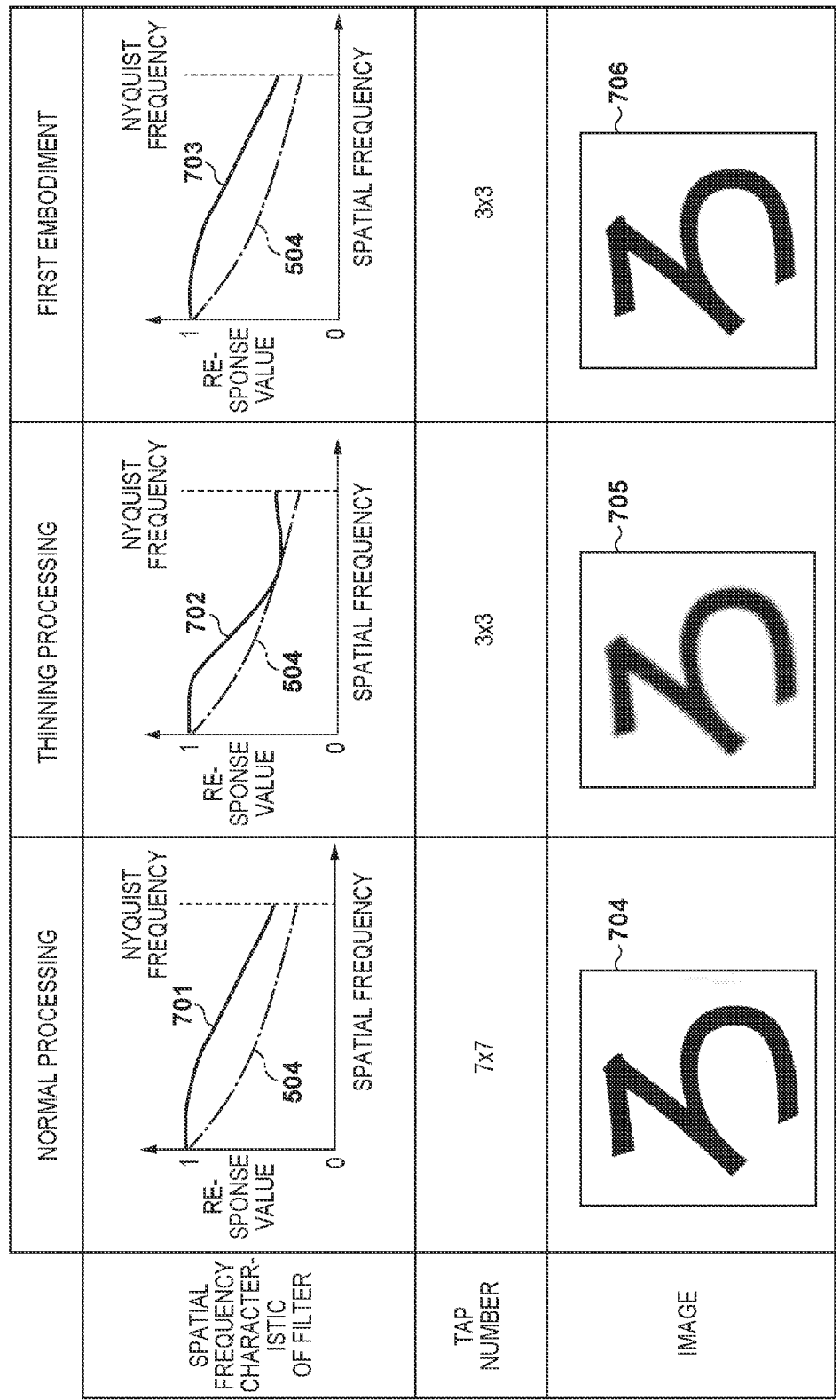
FIG. 7 is a view for comparing an effect of filtering processing.

FIG. 7 is a figure for comparing an effect of filtering processing for each of normal filtering processing, thinning processing, and filtering processing according to the present embodiment. In the normal filtering processing the filter 301 of FIG. 3 is used, in the thinning processing the filter 302 of FIG. 3 is used, and in the filtering processing according to the present embodiment the filters 401 through 403 of FIG. 4 are used. The reference numerals 701 through 703 respectively represent a frequency characteristic obtained by normal filtering processing, a frequency characteristic obtained by the filtering processing in thinning processing, and a frequency characteristic obtained by the filtering processing according to the present embodiment. The reference numerals 704 through 706 respectively represent a filter processed image obtained by the normal filtering processing, a filter processed image obtained by the filtering processing in the thinning processing, and a filter processed image obtained by the filtering processing according to the present embodiment.

If the normal filtering processing and the filtering processing in the thinning processing are compared, they are approximately equal in a low frequency domain as illustrated by the frequency characteristics 701 and 702. However, as mentioned previously, because controllability of high frequencies decreases for the filtering processing in the thinning processing, that change of a response value for high frequencies is lower due to the filtering processing for the frequency characteristic 702 in comparison to the frequency characteristic 701 is understood. This is also understood from a comparison of the filter processed images 704 and 705, and in comparison to the filter processed image 704, the filter processed image 705 is seen to be lightly blurred for a high frequency component. Meanwhile, if normal filtering processing and the filtering processing according to the present embodiment are compared, regarding frequency characteristics the frequency characteristic 701 and the frequency characteristic 703 are substantially matched, and in addition the filter processed image 704 and the filter processed image 706 appear to be substantially equal.

Figure 11:
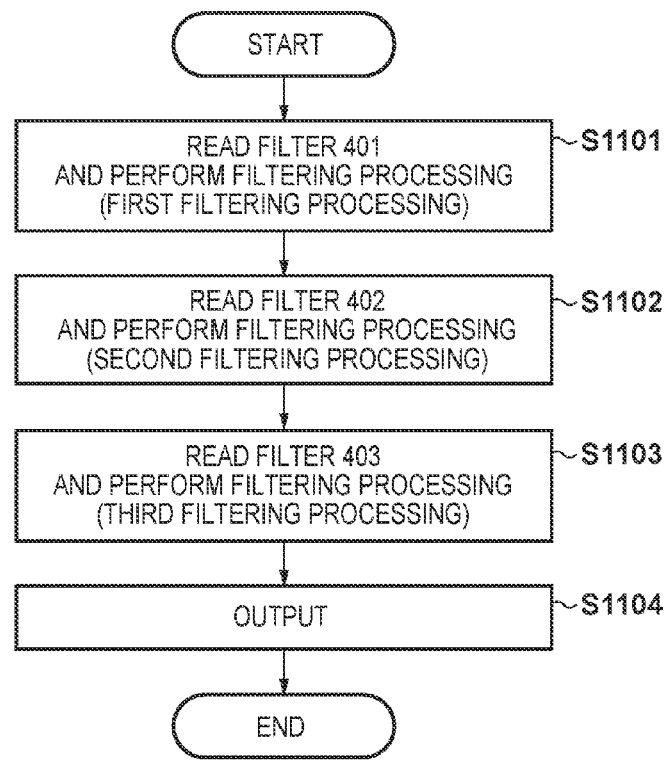
FIG. 11 is a flowchart of operation of the spatial filter circuit 230 in the first embodiment.

Next, description in accordance with the flowchart of FIG. 11 is given for operation of the spatial filter circuit 230. Note that because detail of processing in each step of FIG. 11 is as described above, description is given simply here. In step S1101, the first filtering processing unit 501 reads the filter 401 from a memory such as the external storage apparatus 118 and applies the read filter 401 to an input image to thereby execute filtering processing on the input image. In step S1102, the second filtering processing unit 502 reads the filter 402 from a memory such as the external storage apparatus 118 and applies the read filter 402 to a filter processed image by the first filtering processing unit 501. Thus filtering processing with respect to the filter processed image is executed.

In step S1103, the third filtering processing unit 503 reads the filter 403 from a memory such as the external storage apparatus 118 and applies the read filter 403 to a filter processed image by the second filtering processing unit 502. Thus filtering processing with respect to the filter processed image is executed. In step S1104 the third filtering processing unit 503 outputs the image to which the filtering processing in step S1103 was performed to the color space conversion circuit 240 which is a subsequent stage. Note that what is outputted is not limited to a whole image, and configuration may be taken to output only a portion in an image to which filtering processing was performed.

In this way, according to the present embodiment, by sequentially applying to an image each of a plurality of filters that arrange significant coefficients in accordance with a frequency band to control, it is possible to satisfactorily perform control from low frequencies to high frequencies with a small calculation amount.

Second Embodiment

According to the first embodiment, it is possible to improve controllability of a frequency component by using a plurality of filters having different arrangements of the significant coefficients to perform filtering processing a plurality of times. However, as the number of times of the filtering processing increases the processing time unsurprisingly increases to be more than for a case of one round of filtering processing. Because an image quality commonly improves as controllability of the frequency component gets better, there is a trade-off relation between image quality and processing time. Accordingly, in the present embodiment, modes for whether to apply all filters or apply some filters are provided, and filters according to a mode selected by a user operation or the like are applied to an image. By such a configuration, it is possible to select a mode that corresponds to a desired balance between image quality and processing time, for example. Selection of a mode may be performed by a user operating an operation unit (not shown), or may be performed by the CPU 112 in accordance with a situation.

Figure 8:
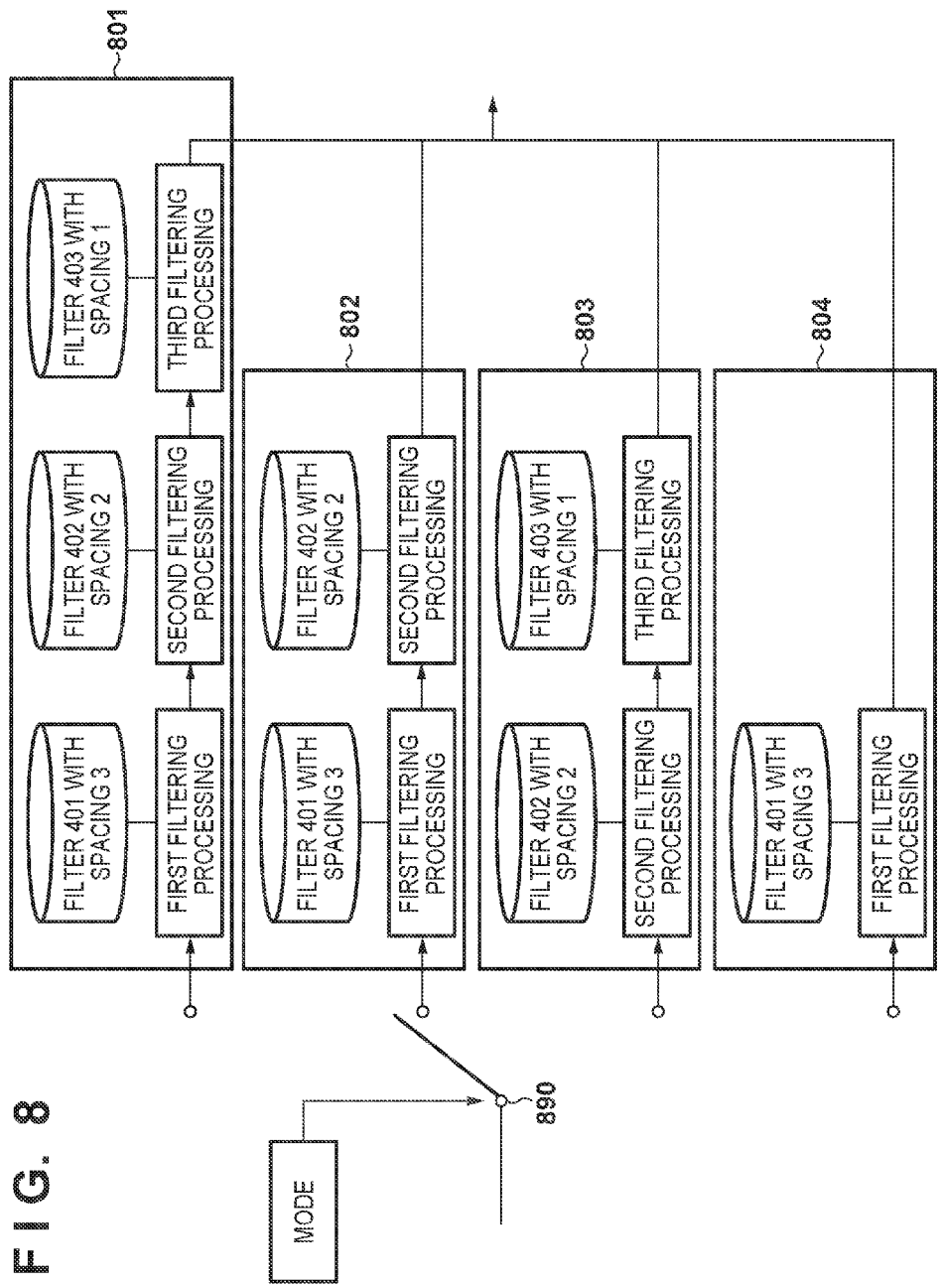
FIG. 8 is a block diagram illustrating a third example configuration of the spatial filter circuit 230.

Explanation is given below predominantly regarding differences with the first embodiment, and is assumed to be the same as the first embodiment to the extent that something is not touched upon in particular below. In the present embodiment the spatial filter circuit 230 has a configuration that is exemplified in FIG. 8. The spatial filter circuit 230 according to the present embodiment executes filtering processing on an input image by causing one of the processing units 801 through 804 to operate in accordance with a mode designated by a user selection or the like.

A switch unit 890 selects a corresponding one out of the processing units 801 through 804 in accordance with the user selection or the like. Similarly to the first embodiment, a processing unit 801 executes the first filtering processing, the second filtering processing, and the third filtering processing with respect to the image. A processing unit 802 executes the first filtering processing and the second filtering processing with respect to the image. A processing unit 803 executes the second filtering processing and the third filtering processing with respect to the image. A processing unit 804 executes the first filtering processing with respect to the image. In other words, the spatial filter circuit 230 uses filters in accordance with a selected mode to execute filtering processing on the input image.

Here, the processing unit 801 has the longest processing time out of the processing units 801 through 804, the next longest is for the processing units 802 and 803, and the shortest is for the processing unit 804. However, for image quality of a filter processed image, the processing unit 801 can control low frequencies-high frequencies, the processing unit 802 can control low frequencies-medium frequencies, the processing unit 803 can control medium frequencies-high frequencies, and the processing unit 804 can only control low frequencies.

Next, description is given regarding a detailed example of mode changing. For example, assume that it is possible to select one of a high speed mode, a standard mode, and a high image quality mode by a user operating an operation unit (not shown). Here, if the user operates the operation unit to select the high speed mode, the switch unit 890 selects the processing unit 804. Here, if the user operates the operation unit to select the standard mode, the switch unit 890 selects the processing unit 802. In addition, if the user operates the operation unit to select the high image quality mode, the switch unit 890 selects the processing unit 801. If focus is given to the frequency component of an image, because visual sensitivity becomes high and a contribution to image quality increase as the frequency decreases, by controlling in an order from low frequencies in this way, it is possible to enhance an image quality improvement effect for the processing time. Meanwhile, if as in the processing unit 803 control is performed in an order from medium frequencies instead of from low frequencies, although an image quality improvement effect is worse than for the processing unit 802 which has the same processing time, if gain of a low frequency component of the input image is small then the processing unit 803 is suitable. That is, configuration may be taken so as to select an optimal configuration in accordance with a desired filter frequency characteristic. Note that, as described above, instead of selecting a desired combination from filtering processing combinations, which filter to use may be selected.

In addition, as another example of mode changing, there is a case in which a copy mode (a mode for performing reading of an original and a print output) and a scan mode (a mode for performing only reading of an original) are provided. In the copy mode, whereas high speed processing is necessary because print output is performed at the same time as reading, in the scan mode a speed that is the same as for the copy mode is not necessary. Accordingly, if the copy mode is selected, the switch unit 890 selects the processing unit 804, and if the scan mode is selected the switch unit 890 selects the processing unit 801. Alternatively, if processing time exceeds a predetermined threshold after using the processing unit 801 in an initial stage of processing in the copy mode, processing is cut off part way through, and the processing unit 802 or the processing unit 804 is selected.

In this way, by setting a number of times of the filtering processing to be lower in the copy mode than in the scan mode, it is possible to realize stable operation having no delay in processing in the copy mode and realize high image quality in the scan mode. In other words, there are various configurations for, if a mode for performing filtering processing at a higher speed is set, selecting a set of filters whose number is small, and if a mode for performing filtering processing at higher image quality is set, selecting a set of filters whose number is large.

In addition, as another example, if it is possible to select a high-quality sheet (photo paper or the like) or a low-quality sheet (normal paper or the like) at a time of print output, because an effect of filtering processing is hard to see if the low-quality sheet is used, a number of times of processing is set lower than for a case in which the high-quality sheet is used. For example, the processing unit 801 is selected for the high-quality sheet and the processing unit 804 is selected for the low-quality sheet. In other words, if a setting is made for recording an image for which the filtering processing is to be performed to a high-quality printing medium, a larger number of filters are selected. Meanwhile, if a setting is made for recording an image for which the filtering processing is to be performed to a low-quality printing medium, a smaller number of filters are selected. In this way, by setting a number of times of filtering processing to be low in a case where the effect of the filtering processing will be hard to see, it is possible to prevent waste of a lengthening processing time despite the effect being small.

Description in accordance with the flowchart of FIG. 12 is given for operation of the spatial filter circuit 230 according to the present embodiment. Note that because detail of processing in each step of FIG. 12 is as described above, description is given simply here.

In step S1201, the switch unit 890 determines which of first through fourth modes is set by a user operation or the like. The first through fourth modes include various modes for changing filters to use, such as the above high speed mode, standard mode, high image quality mode, scan mode, copy mode, mode for using a high-quality sheet, mode for using a low-quality sheet, or the like. If a result of the determination is that the first mode is set the processing proceeds to step S1202, and if the second mode is set the processing proceeds to step S1203. Meanwhile, if the third mode is set the processing proceeds to step S1204, and if the fourth mode is set the processing proceeds to step S1205.

In step S1202, because the switch unit 890 instructs operation to the processing unit 801, the processing unit 801 executes filtering processing with respect to an input image by performing similar processing to the processing in accordance with the flowchart of FIG. 11. In step S1203 the switch unit 890 instructs operation to the processing unit 802. The processing unit 802 reads the filter 401 from a memory such as the external storage apparatus 118, and applies the read filter 401 to the input image. Thus filtering processing with respect to the input image is executed. Thereafter the processing unit 802 reads the filter 402 from a memory such as the external storage apparatus 118 and applies the read filter 402 to the image that has been subject to the filtering processing that uses the filter 401 to thereby execute filtering processing on the image that has been subject to the filtering processing.

In step S1204 the switch unit 890 instructs operation to the processing unit 803. The processing unit 803 reads the filter 402 from a memory such as the external storage apparatus 118 and applies the read filter 402 to the input image to thereby execute filtering processing on the input image. Thereafter the processing unit 803 reads the filter 403 from a memory such as the external storage apparatus 118 and applies the read filter 403 to the image that has been subject to the filtering processing that uses the filter 402 to thereby execute filtering processing on the image that has been subject to the filtering processing.

In step S1205 the switch unit 890 instructs operation to the processing unit 804. The processing unit 804 reads the filter 401 from a memory such as the external storage apparatus 118 and applies the read filter 401 to the input image to thereby execute filtering processing on the input image. Note that each of the processing units 801 through 804 outputs an image to which filtering processing has been performed to the color space conversion circuit 240 which is a subsequent stage. Note that what is outputted is not limited to a whole image, and configuration may be taken to output only a portion in an image to which filtering processing was performed.

Third Embodiment

In the second embodiment, although a number of times of filtering processing was changed in accordance with a mode, in the present embodiment a number of times of filtering processing with respect to a target area is controlled in accordance with the position of the target area which is the target of the filtering processing. Specifically, in an image area having many high frequency components (a region of text or a line drawing), because as many frequency bands as possible are controlled, the number of times of the filtering processing is set to be many. Meanwhile, in an image area having few high frequency components (an area of a natural image), because an effect is unlikely to emerge even if control is performed from low frequencies to high frequencies, the number of times of filtering processing is set to be few. Thus, it is possible to improve an image quality improvement effect for the processing time. Below, explanation is given predominantly regarding differences with the first embodiment, and to the extent that something is not touched upon particularly below, it is the same as in the first embodiment.

Figure 9:
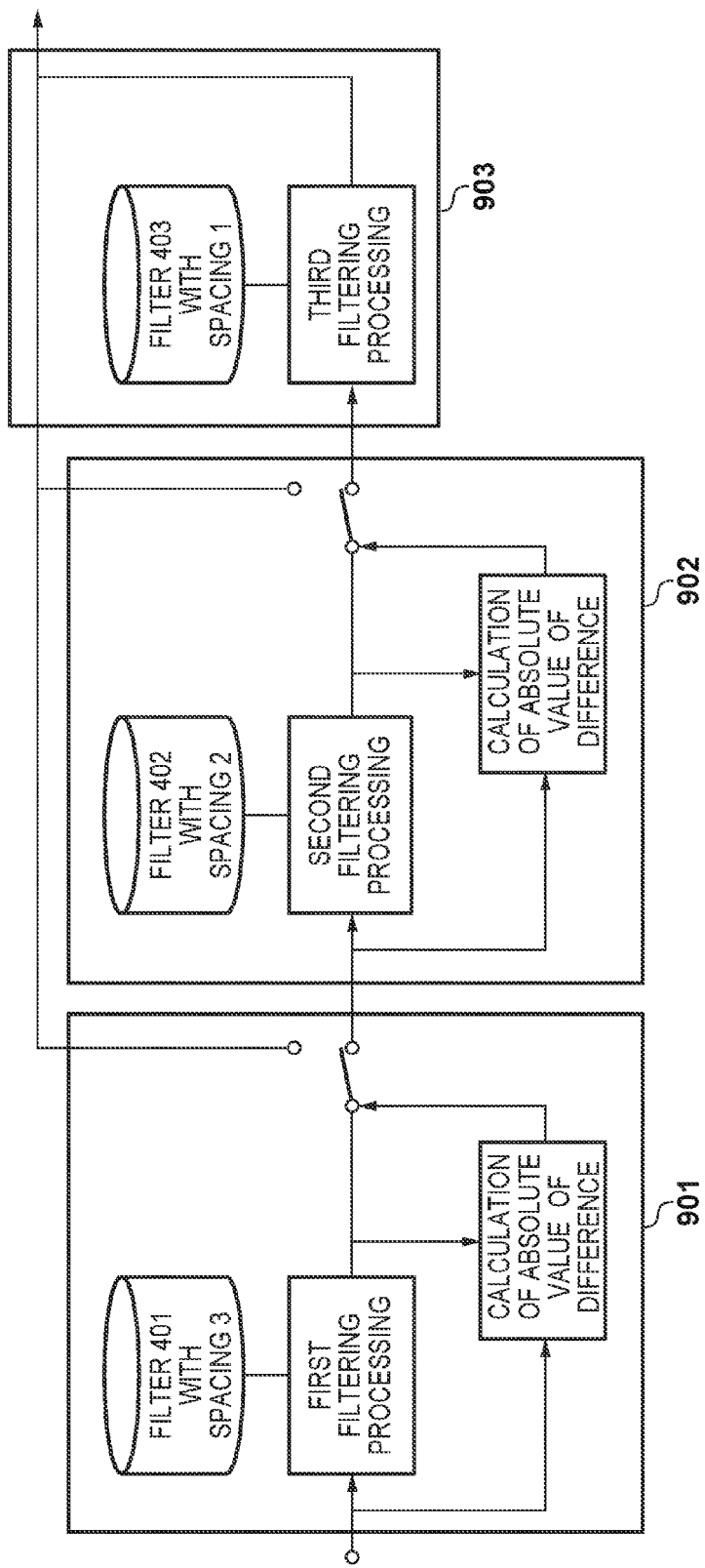
FIG. 9 is a block diagram illustrating a fourth example configuration of the spatial filter circuit 230.

The block diagram of FIG. 9 is used to give a description regarding an example configuration of the spatial filter circuit 230 according to the present embodiment. The spatial filter circuit 230 according to the present embodiment has a processing unit 901 for performing the first filtering processing, a processing unit 902 for performing the second filtering processing, and a processing unit 903 for performing the third filtering processing. Assume that the processing unit 901 performs the first filtering processing with respect to an input image, the processing unit 902 performs the second filtering processing with respect to the filter processed image in accordance with the image subject to filtering processing by the processing unit 901, and the processing unit 903 performs the third filtering processing with respect to the image subject to filtering processing by the processing unit 902. At this point, a filter processed image output from the processing unit 903 is the same as the image O_3 in FIG. 5.

In the present embodiment, control is performed in an order from low frequencies that have high visual sensitivity, similarly to in the second embodiment. Firstly, in the processing unit 901, by performing the first filtering processing with respect to an input image I the image O_1 is generated, and furthermore a difference in value between the input image I and the image O_1 (an absolute value of a difference) is obtained as a low frequency control effect. For example, if the input image I is divided into a plurality of image areas, and for each image area "a sum total of differences (absolute values) between the pixel value of each pixel in the image area and the pixel value of each pixel in an image area of the image O_1 corresponding to the image area" is obtained as the low frequency control effect in the image area. Note that a method of obtaining a low frequency control effect is not limited to this, and any value may be used if it is a value by which it is possible to quantitatively evaluate how much change there is between before and after performing the first filtering processing. An image area for which the value of the low frequency control effect is less than a threshold is considered as an image area for which an effect is hard to emerge even if a different filter is further used to perform filtering processing, and output to the color space conversion circuit 240 without performing second or subsequent filtering processing (the second filtering processing and the third filtering processing). However, an image area (the first filtering processing is complete) for which the value of the low frequency control effect exceeds the threshold is output to the processing unit 902.

The processing unit 902 performs the second filtering processing with respect to the image area from the processing unit 901, and obtains as a medium frequency control effect a difference in value (an absolute value of the difference) between the image area from the processing unit 901 and a result of performing the second filtering processing with respect to image area. A method of obtaining the medium frequency control effect is similar to the method of obtaining the low frequency control effect. An image area for which the value of the medium frequency control effect is less than a threshold is considered to be an image area for which an effect will be hard to emerge even if the number of times of filtering processing is increased, and is output to the color space conversion circuit 240 without performing third or subsequent filtering processing (third filtering processing). However, an image area (the second filtering processing is complete) for which the value of the medium frequency control effect exceeds the threshold is output to the processing unit 903.

The processing unit 903 performs the third filtering processing on the image area from the processing unit 902, and an image area to which the third filtering processing has been performed is output to the color space conversion circuit 240. In other words, the spatial filter circuit 230 according to the present embodiment operates as follows if a difference between an image to which a filter of interest is to be applied and an image after the filter of interest is applied to the image exceeds a threshold. That is, a filter having a smaller size and a narrower arrangement spacing of significant coefficients than a filter of interest is applied to an image after the filter of interest is applied to perform filtering processing. Meanwhile, if a difference between an image to which a filter of interest is to be applied and an image after the filter of interest is applied to the image is less than a threshold, the spatial filter circuit 230 does not perform further filtering processing to the image after the filter of interest is applied.

Description in accordance with the flowchart of FIG. 13 is given for operation of the spatial filter circuit 230 according to the present embodiment. Note that because detail of processing in each step of FIG. 13 is as described above, description is given simply here. In step S1301, the processing unit 901 reads the filter 401 from a memory such as the external storage apparatus 118 and applies the read filter 401 to an input image I to thereby generate an image O_1 that is the input image to which filtering processing is complete. Furthermore the processing unit 901 obtains a difference in value (an absolute value of the difference) between the input image I and the image O_1 as a low frequency control effect.

In step S1302, the processing unit 901 determines whether there is an image area for which a value of the low frequency control effect obtained in step S1301 exceeds a threshold. The processing unit 901 outputs to the color space conversion circuit 240 an image area for which the value of the low frequency control effect is below the threshold, and outputs an image area for which the value of the low frequency control effect exceeds the threshold to the processing unit 902. If a result of this determination is that there is an image area for which the value of the low frequency control effect exceeds the threshold, the processing proceeds to step S1303, and if not the processing in accordance with the flowchart of FIG. 13 terminates.

In step S1303, the processing unit 902 reads the filter 402 from a memory such as the external storage apparatus 118 and applies the read filter 402 to the image area output from the processing unit 901 to thereby execute filtering processing on the image area. Furthermore, the processing unit 902 obtains a difference in value (an absolute value of the difference) between the image area output from the processing unit 901 and the result of performing the filtering processing on the image area in this step as a medium frequency control effect. In step S1304, the processing unit 902 determines whether there is an image area for which a value of the medium frequency control effect obtained in step S1303 exceeds a threshold. The processing unit 902 outputs to the color space conversion circuit 240 an image area for which the value of the medium frequency control effect is below the threshold, and outputs an image area for which the value of the medium frequency control effect exceeds the threshold to the processing unit 903. If a result of this determination is that there is an image area for which the value of the medium frequency control effect exceeds the threshold, the processing proceeds to step S1305, and if not the processing in accordance with the flowchart of FIG. 13 terminates.

In step S1305, the processing unit 903 reads the filter 403 from a memory such as the external storage apparatus 118 and applies the read filter 403 to the image area output from the processing unit 902 to thereby execute filtering processing on the image area. The processing unit 903 outputs the image area to which filtering processing using the filter 403 is performed to the color space conversion circuit 240.

Note that, in the above description, only an image area for which a value of the low frequency control effect or a value of the medium frequency control effect exceeds a threshold is transferred to a processing unit that is a subsequent stage, and an image area for which the threshold is not exceeded is transferred to the color space conversion circuit 240. However, the spatial filter circuit 230 may be configured as follows. If an image area for which a value of the low frequency control effect in the image exceeds a threshold is not present, the processing unit 901 transfers the image to the color space conversion circuit 240, and if even one is present the image is transferred to the processing unit 902. The processing unit 902 performs the second filtering processing on the image area, in the image transferred from the processing unit 901, for which the value of the low frequency control effect exceeds in the threshold. If an image area for which the value of the medium frequency control effect exceeds the threshold is not present in the image for which filtering processing is complete, the processing unit 902 transfers the image to the color space conversion circuit 240, and if at least one image area is present, the image is transferred to the processing unit 903. The processing unit 903 performs the third filtering processing on the image area, in the image transferred from the processing unit 902, for which the value of the medium frequency control effect exceeds in the threshold, and the transfers the image to the color space conversion circuit 240.

In this way, according to the present embodiment, all filtering processing is performed to a region for which the effect of filtering processing that uses a plurality of filters for controlling frequency components that are mutually different is easy to emerge. Thus, it is possible to enhance an image quality improvement effect for the processing time. Note that, in the example of FIG. 9, whether or not to perform further filtering processing is determined based on an absolute value of a difference for before and after filtering processing, but another method may be used for this determination. For example, configuration may also be taken such that edge intensity is obtained by a publicly known method, and if the obtained edge intensity is greater than or equal to a threshold, additional filtering processing is performed, and if less than the threshold additional filtering processing is not performed. In other words, a number of filters to apply to an image may be determined in accordance with edge intensity of the image.

In addition, a number of times of filtering processing on an image may be decided based on attribute information set in advance in the image (attribute information by which it is possible to distinguish text, a line drawing, or a natural image). In such a case, a number of times of filtering processing for text or a line drawing is set to be more than for a natural image. In other words, a number of filters to apply to an image may be determined in accordance with an image attribute of the image.

<Variation>

In the above described embodiments, a number of filters for which frequency bands to control are mutually different was given as three (a maximum number of times of filtering processing is three) in the description, but a maximum number of times is not limited to three. In addition, in the above embodiment, a tap number used in each filtering processing was given as a constant in the description, but the tap number may be changed for each filtering processing. For example, in the filtering processing of FIG. 5, the tap number may be changed from 3×3 to 5×5 by setting the spacing of the significant coefficients of the filter 402 used in second filtering processing to 1.

Figure 10A:
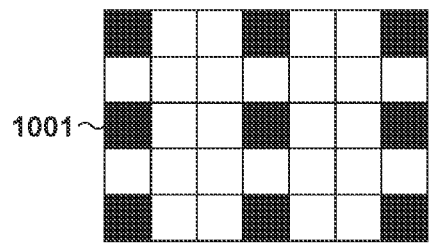
FIGS. 10A and 10B are views illustrating filter variations.

In addition, configuration may be taken such that for a filter, a vertical size and a horizontal size are not the same, and spacing in a vertical direction and spacing in a horizontal direction for the significant coefficients are not the same, as in a filter 1001 as illustrated in FIG. 10A (a representation of the significant coefficients and the inactive coefficients is the same as in FIGS. 4 and 5). As an example, a case in which blurring generated by a text print processing due to an ink-jet printer is recovered by the filtering processing of FIG. 5 is envisioned. For an ink-jet printer, blurring occurs more easily in a horizontal direction than in a vertical direction. Therefore, in processing for controlling mainly low frequencies (as in the first filtering processing of FIG. 5, processing that uses a filter for which a reference area is widest out of a plurality of times of filtering processing), a filter for which the size of the reference area in the horizontal direction is larger than in the vertical direction is used. In this example, the filter 1001 is used instead of the filter 401. Thus, it is possible to recover blurring by the ink-jet printer more satisfactorily.

Figure 10B:
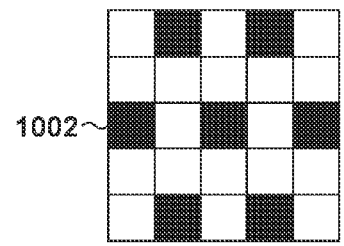

In addition, the reference area of a filter is not limited to a rectangle. Normally, because there are many blurring characteristics of an optical system that are close to circular, if a filter having a rectangular reference area is used when recovering for blurring, it is often that values of four filter coefficients corresponding to vertices of the rectangle are approximately 0. Accordingly, by configuring the filter as in a filter 1002 of FIG. 10B (a representation of the significant coefficients and the inactive coefficients being the same as FIGS. 4 and 5), the reference area is configured to be a hexagon. With such a configuration, it is possible to refer to a wider region in accordance with few tap numbers. A filter having, as above, a reference area close to a circle instead as a rectangle is particularly effective in processing for controlling mainly low frequencies (as in the first filtering processing of FIG. 5, processing that uses a filter for which a reference area is widest out of a plurality of filtering processes). For example, in a case of performing filtering processing two times as in the processing unit 803 of FIG. 8, by using the filter 1002 instead of the filter 402 in the second filtering processing, it is possible to reduce a tap number without causing the size of the reference area to change much.

In this way, if the significant coefficients are arranged in a grid pattern, the shape of the arrangement spacing of the significant coefficients and the reference area can be set in any fashion. In other words, when two-dimensional vectors v1 and v2 that connect between pixels are set to unit lattice vectors and a, b are set to integers, arranging the significant coefficients at positions such as v=a×v1+b×v2 is desirable. At this point, the direction and length of the unit lattice vectors v1 and v2 and the range of the integers a, b can be set arbitrarily. All of the filters illustrated thus far (filters 302, 401, 402, 403, 1001, and 1002) are arranged such as the significant coefficients are in a grid pattern. If the significant coefficients are arranged in a grid pattern, it is possible to consider the influence of more pixels by fewer reference pixels, and controllability of the frequency components improves in comparison to a case of not arranging the significant coefficients in a grid pattern.

For example, a case of performing filtering processing twice that uses the filter 401 and the filter 403 in which the significant coefficients are arranged in a grid pattern is envisioned. This processing is equivalent to processing that applies once a filter that combines the filter 401 and the filter 403 by performing a convolution operation. Because arrangement of the significant coefficients of the filter that combines the filter 401 and the filter 403 is as reference numeral 1401 of FIG. 14A, it is possible consider the influence of all pixels in a 9 vertical pixels×9 horizontal pixels reference area.

Figure 14C:
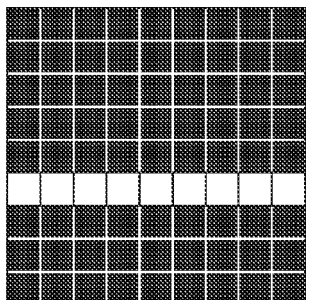
FIGS. 14A through 14E are views for explaining in relation to filters.
Figure 14B:
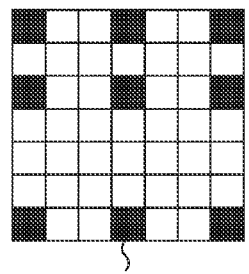

However, in this processing, if a filter 1402 (FIG. 14B) that does not arrange significant coefficients in a grid pattern is used instead of the filter 401, because for the filter 1402 the significant coefficients are not evenly spaced apart, arrangement of the significant coefficients of a filter that combines the filter 1402 and the filter 403 is as reference numeral 1403 of FIG. 14C. Therefore, it is not possible to consider the effect of all pixels in a 9 vertical pixels×9 horizontal pixels reference area, and controllability of frequency components is worse in comparison to when the filter 401 is used.

From such a reason, in the previously described embodiments, by arranging the significant coefficients of each filter in a grid pattern and causing the arrangement spacing thereof to be different, it is possible to consider the effect of more pixels by fewer reference pixels in a plurality of times of filtering processing.

In addition, to consider the effect of more pixels by fewer reference pixels, it is effective to configure such that the orientation of the unit lattice vectors of each filter used in the plurality of filtering processes are aligned. For example, a case of performing filtering processing twice that uses the filter 401 and the filter 403 is envisioned. For the filter 401 and the filter 403, the directions of the unit lattice vectors are aligned, and are right-facing and upward-facing for both. Therefore, arrangement of the significant coefficients of the filter that combines the filter 401 and the filter 403 is as reference numeral 1401 of FIG. 14A, and it is possible consider the influence of all pixels in a 9 vertical pixels×9 horizontal pixels reference area.

Figure 14E:
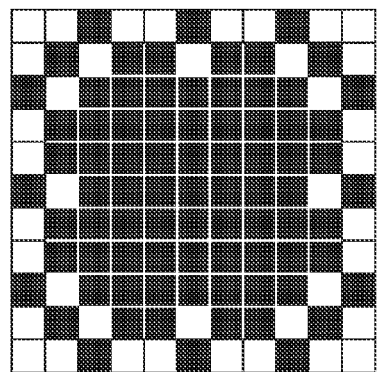
Figure 14A:
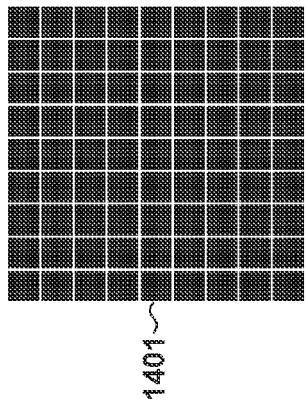
Figure 14D:
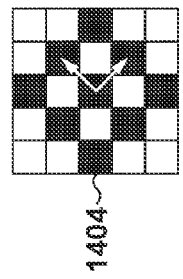

Meanwhile, in this processing, if the filter 1404 (FIG. 14D) is used instead of the filter 403, arrangement of the significant coefficients of a filter that combines the filter 401 and the filter 1404 becomes as in reference numeral 1405 of FIG. 14E. The orientations of the unit lattice vectors of the filter 1404 are diagonally right upward and diagonally right downward as illustrated in FIG. 14D, and differs to the orientation of the unit lattice vectors of the filter 401. Therefore, for the filter 1405, the size of the reference area becomes 11 vertical pixels×11 horizontal pixels, and although it is possible to consider the influence of a range of pixels that is wider than for the filter 1401, it becomes impossible to consider the influence of all pixels in the reference area. In particular, if considering the effect of all pixels in a 9 vertical pixels×9 horizontal pixels region is desired, this is possible if the filter 401 and the filter 403 are used, but this is impossible if the filter 401 and the filter 1404 are used. From such a reason, in the first embodiment, configuration was taken so that, by aligning the orientation of the unit lattice vectors of the filters 401, 402, and 403, it is possible to consider the effect of more pixels by fewer reference pixels.

In addition, if realizing image processing such as for recovery of blurring of an optical system by a plurality of filtering processes as illustrated in previously described embodiments, for a combined filter if a sum total of coefficients is not set to approximately 1, brightness of the image on the whole will change between before and after the processing. To set the sum total of coefficients of a combined filter to approximately 1, each coefficient may be decided such that the sum total of the filter coefficients k_b used in normal filtering processing becomes approximately 1.

However, even if it is possible to decide such that the sum total of the combined filter coefficients becomes approximately 1, there may be cases in which the sum total does not become approximately 1 for each filter used in a plurality of processing. For example, if performing filtering processing two times, there may be cases where coefficients used in the first filtering processing have a sum total of 2, and coefficients used in the second filtering processing have a sum total of 0.5. In other words, the image becomes brighter overall in the first processing and the image becomes darker overall in the second processing. In a case of performing a calculation that uses a finite length of bits, if the overall brightness of an image changes, information is lost due to clipping or round processing, and image quality deteriorates. Therefore it is desirable for not just a combined filter but for each filter used in a plurality of processing that the sum total of coefficients is set to approximately 1.

For example, the significant coefficients of each filter are determined by setting a central coefficient of each filter to dependent variables. Specifically, the central coefficient is set to a value for which the sum total of coefficients other than center is subtracted from 1. Alternatively, after obtaining each filter coefficient, for each filter coefficient, normalizing each coefficient by dividing by the sum total of coefficients is performed. If these methods are used, it is possible to determine such that the sum total of coefficients becomes approximately 1 for any filter. Because of this, in a case of performing a calculation that uses a finite length of bits, it is possible to reduce information loss due to clipping or round processing, and improve image quality.

In addition, by setting the size of the filter to use in the filtering processing of FIG. 5 to be smaller than in filtering processing of a subsequent stage, the frequency components are controlled in an ascending order from a low frequency, but there is no limitation to this. For example, reversely filter size may be set to be larger than for filtering processing of a subsequent stage, and the frequency components may be controlled in an order from high frequencies. For example, in a case of the filtering processing of FIG. 5, the filter 403, the filter 402, and the filter 401 may be respectively used in the first filtering processing, the second filtering processing, and the third filtering processing.

Because each filtering processing is a linear calculation, even if the ordering of the filtering processing changes, the final result does not change in terms of equations. However, in a case of performing calculation by using a finite length of bits, by clipping that occurs by a calculation process, how artifacts caused by clipping in accordance with an order of filtering processing arise changes. Actually, the inventor confirmed that there is a case in which artifacts become weaker when control in an order from high frequencies is performed, in comparison to a case in which control is performed in an order from low frequencies. In this way, if artifacts due to clipping are noticeable, it is possible to improve by causing change of the order of the filtering processing.

In addition, the filtering processing in each of the above embodiments is not limited to filtering processing that performs a product-sum operation, and another type of filtering processing may be used, for example non-linear filtering processing such as a median filter.

In addition, a number of times of filtering processing may be changed in accordance with calculation precision of the filtering processing. Calculation precision increases the longer the bit length of a filter coefficient is, where the bit length is a data bit length in regard to filtering processing. Generally, as calculation precision becomes low, controllability of frequency components by filtering processing decreases. Therefore, the lower calculation precision is for filtering processing, a number of times increases. In other words, configuration may be taken to determine a number of filters to apply to an image in accordance with calculation precision of the filtering processing. Thus, it is possible to compensate for image degradation due to having set calculation precision to be low. In addition, changing may also be performed in accordance with a number of bits (bit precision) of an input pixel. That is, configuration may be taken such that, if there are a small number of bits for an input pixel (for example 8 bits) a number of times of processing is increased, and if there is a large number of bits for an input pixel (for example 16 bits) the number of times of processing is decreased. Alternatively, configuration may be taken such that, if there is a small number of bits for an input pixel a number of times of processing are reduced because it can be said that high image quality is not expected for an output image, and if there is a large number of bits for an input pixel a number of times of processing are increased because it can be said that high image quality is expected for an output image.

In addition, in each of the above embodiments, description was given for operation of the spatial filter circuit 230 in a multifunction peripheral. However, the above described function of the spatial filter circuit 230 is not limited to a multifunction peripheral, and can be applied to various devices such as a PC (personal computer), a mobile telephone, a smart phone, or a tablet terminal, if it is a device for performing filtering processing to an input image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-224232, filed Nov. 16, 2015, which is hereby incorporated by reference herein in its entirety.

What is claimed is:

1. An image processing apparatus comprising:
one or more processors; and
at least one memory coupled to the one or more processors, the at least one memory having instructions stored thereon which, when executed by the one or more processors, cause the image processing apparatus to:
acquire an image that is to be a target of filtering processing; and
perform filtering processing to the image by applying to the image a plurality of two-dimensional filters including at least a two-dimensional filter in which significant coefficients to be used in the filter processing and inactive coefficients not to be in the filter processing are two-dimensionally arranged, wherein each of the plurality of two-dimensional filters has a mutually different filter size, arrangement spacing of significant coefficients two-dimensionally arranged in the two-dimensional filter having a larger filter size is larger, and the number of inactive coefficients two-dimensionally arranged in the two-dimensional filter having a larger filter size is more, thereby maintaining low to high frequency control.

2. The image processing apparatus according to claim 1, wherein each of the plurality of two-dimensional filters is a two-dimensional filter in which the significant coefficients are two-dimensionally arranged based on a frequency band to control.

3. The image processing apparatus according to claim 1, wherein each of the plurality of two-dimensional filters is a two-dimensional filter in which the significant coefficients are two-dimensionally arranged in a grid pattern.

4. The image processing apparatus according to claim 1, wherein the plurality of two-dimensional filters is a collection of two-dimensional filters for which the arrangement spacing of the significant coefficients becomes small as the filter size of a two-dimensional filter decreases.

5. The image processing apparatus according to claim 1, wherein the at least one memory stores further instructions, which when executed by the one or more processors, cause the image processing apparatus to:
select from the plurality of two-dimensional filters a two-dimensional filter for processing,
wherein the processing applies the two-dimensional filter selected to the image to perform the filtering processing to the image.

6. The image processing apparatus according to claim 5, wherein the at least one memory stores further instructions, which when executed by the one or more processors, cause the image processing apparatus to select a combination of two-dimensional filters corresponding to a selected mode, out of a plurality of combinations of the plurality of two-dimensional filters.

7. The image processing apparatus according to claim 5, wherein the at least one memory stores further instructions, which when executed by the one or more processors, cause the image processing apparatus to select a smaller number of two-dimensional filters if a mode for performing filtering processing at a higher speed is set.

8. The image processing apparatus according to claim 5, wherein the at least one memory stores further instructions, which when executed by the one or more processors, cause the image processing apparatus to select a larger number of two-dimensional filters if a mode for performing filtering processing at a higher image quality is set.

9. The image processing apparatus according to claim 5, wherein the at least one memory stores further instructions, which when executed by the one or more processors, cause the image processing apparatus to select a larger number of two-dimensional filters if a setting is made for recording an image for which the filtering processing is performed to a higher quality printing medium.

10. The image processing apparatus according to claim 5, wherein the at least one memory stores further instructions, which when executed by the one or more processors, cause the image processing apparatus to select a smaller number of two-dimensional filters if a setting is made for recording an image to which the filtering processing is performed to a lower quality printing medium.

11. The image processing apparatus according to claim 1, wherein the at least one memory stores further instructions, which when executed by the one or more processors, cause the image processing apparatus to, if a difference for the image before and after the filtering processing exceeds a threshold, further perform filtering processing to the image after the filtering processing.

12. The image processing apparatus according to claim 1, wherein the at least one memory stores further instructions, which when executed by the one or more processors, cause the image processing apparatus to, if a difference for the image before and after the filtering processing is less than a threshold, does not further perform filtering processing to the image after the filtering processing.

13. The image processing apparatus according to claim 1, wherein the at least one memory stores further instructions, which when executed by the one or more processors, cause the image processing apparatus to
determine a number of two-dimensional filters to be applied to the image in accordance with edge intensity of the image.

14. The image processing apparatus according to claim 1, wherein the at least one memory stores further instructions, which when executed by the one or more processors, cause the image processing apparatus to
determine a number of two-dimensional filters to be applied to the image in accordance with an image attribute of the image.

15. The image processing apparatus according to claim 1, wherein the at least one memory stores further instructions, which when executed by the one or more processors, cause the image processing apparatus to
determine a number of two-dimensional filters to be applied to the image in accordance with calculation precision of the filtering processing.

16. The image processing apparatus according to claim 1, wherein the at least one memory stores further instructions, which when executed by the one or more processors, cause the image processing apparatus to determine a number of two-dimensional filters to be applied to the image in accordance with bit precision of a pixel in the image.

17. The image processing apparatus according to claim 1, wherein the at least one memory stores further instructions, which when executed by the one or more processors, cause the image processing apparatus to perform the filtering processing by using in an order from a two-dimensional filter having a larger filter size and a larger arrangement spacing of significant coefficients in the two-dimensional filter.

18. The image processing apparatus according to claim 1, wherein the at least one memory stores further instructions, which when executed by the one or more processors, cause the image processing apparatus to perform the filtering processing by using in an order from a two-dimensional filter having a smaller filter size and a smaller arrangement spacing of significant coefficients in the two-dimensional filter.

19. The image processing apparatus according to claim 1, wherein the number of the significant coefficients two-dimensionally arranged in each of the plurality of two-dimensional filters is the same.

20. An image processing method that an image processing apparatus performs, the method comprising:

acquiring an image that is to be a target of filtering processing; and performing filtering processing to the image by applying to the image a plurality of two-dimensional filters including at least a two-dimensional filter in which significant coefficients to be used in the filter processing and inactive coefficients not to be in the filter processing are two-dimensionally arranged, wherein each of the plurality of two-dimensional filters has a mutually different filter size, arrangement spacing of significant coefficients two-dimensionally arranged in the two-dimensional filter having a larger filter size is larger, and the number of inactive coefficients two-dimensionally arranged in the two-dimensional filter having a larger filter size is more, thereby maintaining low to high frequency control.

21. A non-transitory computer-readable storage medium storing a computer program for causing a computer to function as an acquisition unit configured to acquire an image that is to be a target of filtering processing; and a processing unit configured to perform filtering processing to the image by applying to the image a plurality of two-dimensional filters including at least a two-dimensional filter in which significant coefficients to be used in the filter processing and inactive coefficients not to be in the filter processing are two-dimensionally arranged, wherein each of the plurality of two-dimensional filters has a mutually different filter size, arrangement spacing of significant coefficients two-dimensionally arranged in the two-dimensional filter having a larger filter size is larger, and the number of inactive coefficients two-dimensionally arranged in the two-dimensional filter having a larger filter size is more, thereby maintaining low to high frequency control.

* * * * *